United States Patent [19]
Stanley et al.

[11] Patent Number: 5,378,193
[45] Date of Patent: Jan. 3, 1995

[54] VACUUM STUFFING HORN AND METHOD FOR USING SAME

[75] Inventors: Thomas R. Stanley, Georgetown, Ill.; Mark D. Kelley, Kansas City, Mo.; Richard S. Glass, Covington, Ind.

[73] Assignee: Teepak, Inc., Westchester, Ill.

[21] Appl. No.: 88,273

[22] Filed: Jul. 7, 1993

[51] Int. Cl.5 .............................. A22C 11/02
[52] U.S. Cl. ............................. 452/45; 452/27; 452/33; 452/35
[58] Field of Search .......... 452/45, 30, 35, 37, 452/38, 27, 22, 33

[56] References Cited

U.S. PATENT DOCUMENTS

| | | | |
|---|---|---|---|
| 3,122,779 | 3/1964 | Blechschmidt | 452/33 |
| 4,723,581 | 2/1988 | Staudenrausch et al. | 141/5 |
| 5,104,348 | 4/1992 | Powers et al. | 452/45 |
| 5,203,735 | 4/1993 | Stanek | 452/37 |

FOREIGN PATENT DOCUMENTS 1489680 6/1989 U.S.S.R. .

*Primary Examiner*—Willis Little
*Attorney, Agent, or Firm*—Michael L. Dunn

[57] ABSTRACT

A method for stuffing a tubular food casing to reduce trapped air in the finished product. The method comprises placing a shirred stick of food casing on a stuffing horn having an exit end through which food product flows into the casing, withdrawing a leading end portion of the casing over the exit end of the horn, closing the leading end portion, sealing the casing against the horn, drawing a vacuum within the tubular food casing, conducting food product through the exit end of the stuffing horn into said tubular food casing while maintaining the vacuum to stuff a portion of the food casing while withdrawing more casing over the exit end of the stuffing horn, and closing the food casing behind the stuffed portion of the food casing. The invention further includes an apparatus comprising a stuffing horn having an exit end through which food product flows into the casing, means for sealing the casing against the horn, means for drawing a vacuum within the tubular food casing and means for conducting food product through the exit end of the stuffing horn into said tubular food casing while maintaining the vacuum to stuff a portion of the food casing while withdrawing more casing over the exit end of the stuffing horn.

9 Claims, 2 Drawing Sheets

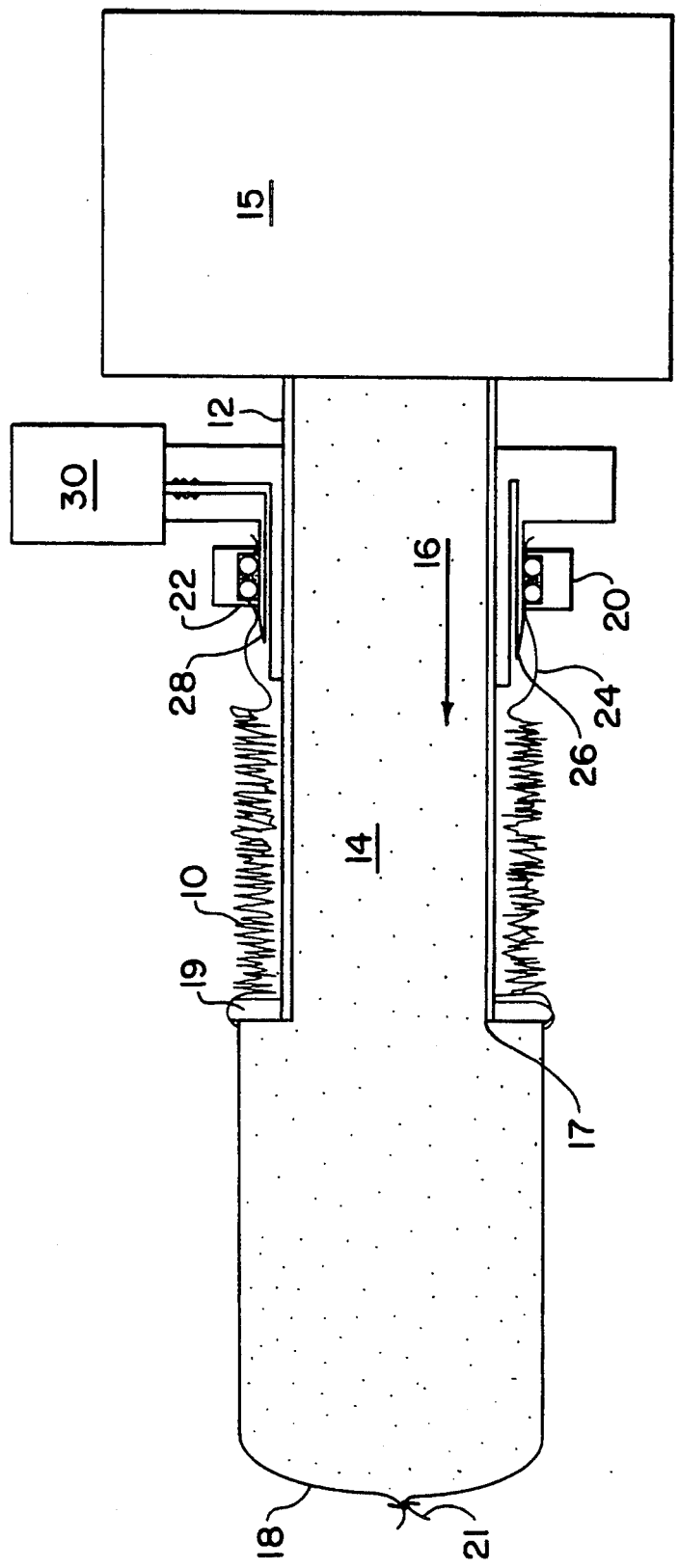
FIG. I

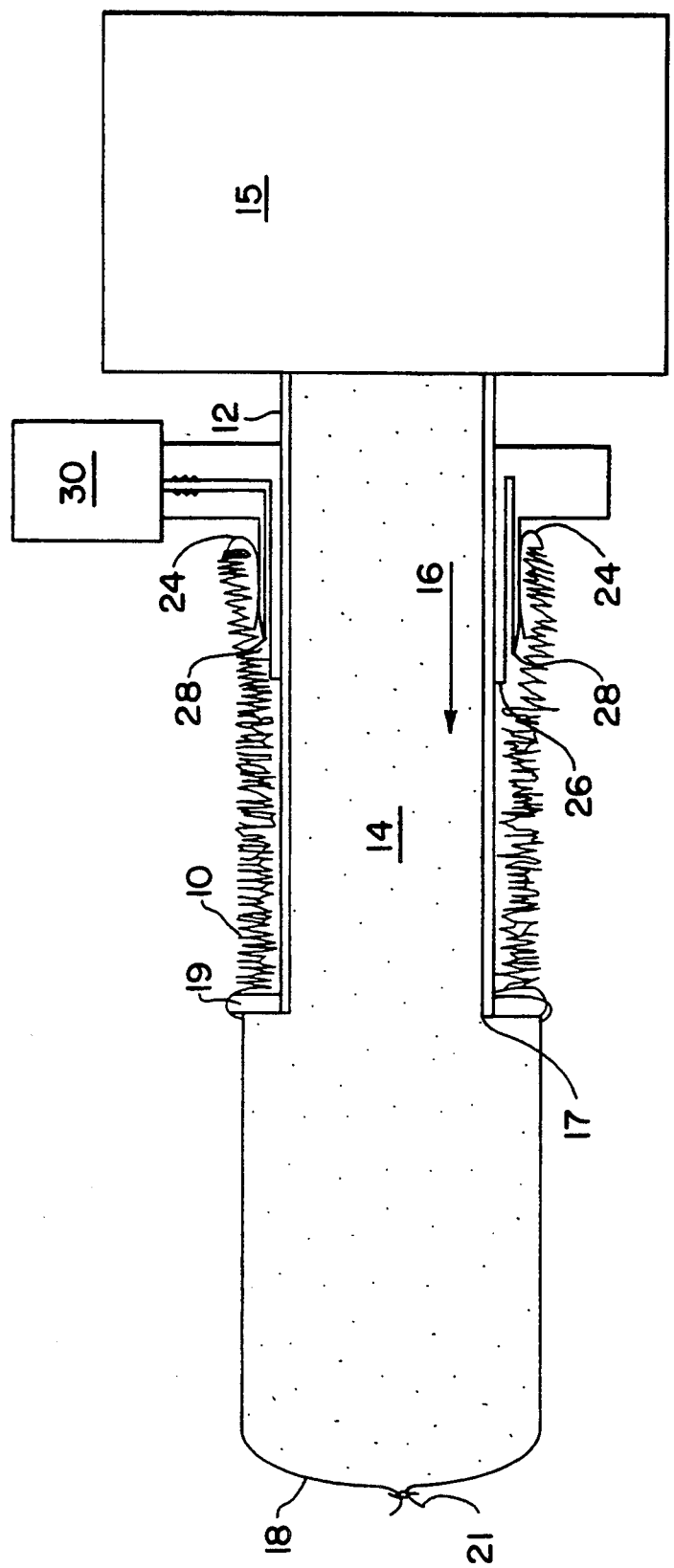

VACUUM STUFFING HORN AND METHOD FOR USING SAME

BACKGROUND OF THE INVENTION

This invention relates to the stuffing of food casings and particularly relates to the stuffing of food casings which are in a shirred form, i.e. tubular food casings which are folded in accordion type pleats along the longitudinal axis of the casing to compress the casing into a shorter length such that a bore runs through the center of the casing.

The shirred casing is then placed over a stuffing horn such that food passes through the stuffing horn into the casing. As the food enters the casing, casing deshirrs from the shirred casing stick or strand until the length of the casing is stuffed with food product. The end of the casing which first receives food product is generally referred to as the leading end of the casing and the end of the casing which last receives food product is generally called the trailing end of the casing. Some kind of knot or clip is placed at the leading end of the casing before the stuffing operation begins so that food is retained within the casing and so that food entering the casing will cause additional casing to deshirr from the shirred casing strand as needed. During the stuffing operation additional clips, twists or ties may be placed along the casing containing food product to created desired lengths or links, e.g. sausage links.

A problem which has been encountered in the stuffing operation is that air can become trapped in the casing along with the food product. Trapped air creates both aesthetic and practical problems. Stuffed food links containing air are often unsightly and non-uniform. the lack of uniformity creates links of product having varying weights. Packages therefore cannot be made containing a uniform number of links while simultaneously having uniform weight. Air also can cause oxidation of food product, especially meats such as sausage, which is contained within the casing. Such oxidation is unsightly and unappetizing and causes degradation of the food product.

There is therefore a need for a method and apparatus for stuffing shirred food casings without introducing and trapping air in the finished stuffed food casing product.

BRIEF DESCRIPTION OF THE INVENTION

In accordance with the present invention a method is therefore provided for stuffing a tubular food casing to reduce trapped air in the finished product.

The method comprises stuffing a tubular food casing, having a leading end, a trailing end and intermediate shirred portion, to reduce trapped air in the finished product. The method comprises placing a shirred stick of food casing, trailing end first on a stuffing horn having an entrance end for receiving food product and an exit end through which food product flows into the casing. The stuffing horn comprises a single tube for holding the shirred portion. The leading end portion of the casing is withdrawn over the exit end of the horn, and the leading end portion is closed. The casing is sealed against the horn at the trailing end, and a vacuum is drawn within the tubular food casing. Food product is conducted through the exit end of the stuffing horn into the tubular food casing while maintaining the vacuum to stuff a portion of the food casing while withdrawing more casing over the exit end of the stuffing horn. The food casing is then closed behind the stuffed portion of the food casing.

Subsequent portions of the food casing may be repeatedly withdrawn over the exit end of the stuffing horn and stuffing same to continue the stuffing operation.

The apparatus comprises a stuffing horn having an entrance end for receiving food product and an exit end through which food product flows into the casing, said stuffing horn comprising a single tube for holding the shirred portion, means for sealing the casing against the horn at the trailing end, means for drawing a vacuum within the tubular food casing, and means for conducting food product through the exit end of the stuffing horn into said tubular food casing while maintaining the vacuum to stuff a portion of the food casing while withdrawing more casing over the exit end of the stuffing horn.

The apparatus may also include means for withdrawing a leading end portion of the casing over an open end of the horn, means for closing the leading end portion and means for closing the food casing behind the stuffed portion of the food casing.

The apparatus of the invention may still further comprise means for repeatedly withdrawing subsequent portions of the food casing over the exit end of the stuffing horn and stuffing same to continue the stuffing operation.

The means for sealing the casing against the horn, for example, comprises a split clamp having a split elastomeric O-ring such that when the clamp is engaged the O-ring presses the casing against the stuffing horn at a location proximate the trailing end of the casing.

As another example, the means for sealing the casing against the stuffing horn may comprise inverting a trailing end of the casing within a bore through the shirred casing strand such that the shirred strand compresses the casing against the stuffing horn at a location proximate the trailing end of the casing.

BRIEF DESCRIPTION OF THE DRAWINGS

FIG. 1 is an elevational view of the present invention, shown in partial cross-section.

FIG. 2 is elevational view of an alternative embodiment of the present invention, shown in partial cross-section.

DETAILED DESCRIPTION OF THE INVENTION

In practicing the method of the present invention, the shirred stick of food casing may be placed on the stuffing horn by any suitable means, e.g. automatically or manually.

Similarly, the leading end of of the casing may be withdrawn over the open end of the horn by any suitable means, e.g. manually or automatically.

The leading end of the casing is closed prior to stuffing, e.g., by tying, knotting or clipping usually with a metallic clip.

In accordance with the present invention the casing sealed, one way or another, against the stuffing horn. Any suitable means for accomplishing such sealing so that a vacuum can be maintained within the casing, can be used. As previously discussed, a split clamp with a split O-ring may be used. The casing itself may be used, e.g. by inverting the trailing end of the casing which will tightly seal against the stuffing horn when the inside diameter of the casing is close to the diameter of the stuffing horn at the location of the seal. the diameter of the stuffing horn may in fact be somewhat larger than the relaxed inside diameter of the food casing at the location of the seal. It is to be understood that "stuffing horn" as used herein is intended to include attached appurtenances such as sleeves located at the position of the seal to assist in the sealing operation.

The invention can be readily understood by reference to the drawings. FIG. 1 illustrates a preferred embodiment of the invention wherein a shirred food, e.g. sausage casing, strand 10, having leading end 10a and trailing end 10b and intermediate shirred portion 10c, is placed over a stuffing horn 12. Food product 14 flows through stuffing horn 12, having entrance end 12a, exit end 17 and single tube portion 12b for holding the shirred portion 10c of strand 10, in the direction of arrow 16 from a food source 15 under pressure to deshirr the casing at the stuffing horn exit end 17 over sizing ring 19 to stuff casing 10 to form a stuffed food product 18 which is tied or clipped at leading end. A split clamp 20 is provided which has a split rubber O-ring 22 to compress the tail end 24 of casing 10 against a cone shaped sleeve 26 which encompasses stuffing horn 12 and forms a part thereof. The pressing of the tail end 24 against cone shaped sleeve 26 forms a sufficient seal to retain a vacuum within the casing 10 caused by a suction or vacuum drawn through ports 28 in sleeve 26 connected to a vacuum source 30. As a result of using the vacuum stuffing horn of the invention, stuffed product 18 contains insufficient air to cause unsightly pockets or significant oxidation of contained food product.

FIG. 2 shows an alternative embodiment which also has a shirred food, e.g. sausage, casing strand 10 placed over a stuffing horn 12 through which food product 14 flows in the direction of arrow 16 to deshirr and stuff casing 10 to form a stuffed food product 18. The alternative embodiment shown in FIG. 2 does not however have the split ring of the embodiment shown in FIG. 1, but instead relies upon a tight fit between inverted tail end 24 and cone shaped sleeve 26. In general, to maintain the tight fit, the inside diameter of shirred strand 10 is the same or smaller than the outside diameter of a sleeve 26. Again, as with the embodiment in FIG. 1, a vacuum is drawn through ports 28 to remove air from the stuffed food product 18.

What is claimed is:

1. A method for stuffing a tubular food casing, having a leading end, a trailing end and intermediate shirred portion, to reduce trapped air in the finished product, said method comprising placing a shirred stick of food casing, trailing end first on a stuffing horn having an entrance end for receiving food product and an exit end through which food product flows into the casing, said stuffing horn comprising a single tube for holding the shirred portion, withdrawing the leading end portion of the casing over the exit end of the horn, closing the leading end portion, sealing the casing against the horn at the trailing end, drawing a vacuum within the tubular food casing, conducting food product through the exit end of the stuffing horn into said tubular food casing while maintaining the vacuum to stuff a portion of the food casing while withdrawing more casing over the exit end of the stuffing horn, and closing the food casing behind the stuffed portion of the food casing.

2. The method of claim 1 wherein subsequent portions of the food casing are repeatedly withdrawn over the exit end of the stuffing horn and stuffing same to continue the stuffing operation.

3. The method of claim 1 wherein the food casing is a sausage casing and the food product being stuffed into the casing is sausage meat.

4. An apparatus for stuffing a shirred stick of tubular food casing, said casing having a leading end and a trailing end, and an intermediate shirred portion, to reduce trapped air in the finished product, said apparatus comprising a stuffing horn having an entrance end for receiving food product and an exit end through which food product flows into the casing, said stuffing horn comprising a single tube for holding the shirred portion, means for sealing the casing against the horn at the trailing end, means for drawing a vacuum within the tubular food casing, and means for conducting food product through the exit end of the stuffing horn into said tubular food casing while maintaining the vacuum to stuff a portion of the food casing while withdrawing more casing over the exit end of the stuffing horn.

5. The apparatus of claim 4 wherein the apparatus further comprises means for withdrawing a leading end portion of the casing over an open end of the horn, means for closing the leading end portion, and means for closing the food casing behind the stuffed portion of the food casing.

6. The apparatus of claim 5 wherein the apparatus further comprises means for repeatedly withdrawing subsequent portions of the food casing over the exit end of the stuffing horn and stuffing same to continue the stuffing operation.

7. The apparatus of claim 4 wherein the means for sealing the casing against the horn comprises a split clamp having a split elastomeric O-ring such that when the clamp is engaged the O-ring presses the casing against the stuffing horn at a location proximate a trailing end of the casing.

8. The apparatus of claim 4 wherein the means for sealing the casing against the stuffing horn comprises inverting a trailing end of the casing within a bore through the shirred casing strand such that the shirred strand compresses the casing against the stuffing horn at a location proximate the trailing end of the casing.

9. The apparatus of claim 4 wherein the food casing is a sausage casing and the food product being stuffed into the casing is sausage meat.

* * * * *